United States Patent [19]

Kishner et al.

[11] Patent Number: 4,546,700

[45] Date of Patent: Oct. 15, 1985

[54] METHOD AND APPARATUS FOR SENSING AND MAINTAINING COLOR REGISTRATION

[75] Inventors: Stanley J. Kishner, Pomona; Ernest D. Park, Hopewell Junction, both of N.Y.

[73] Assignee: Kollmorgen Technologies Corporation, Dallas, Tex.

[21] Appl. No.: 567,619

[22] Filed: Jan. 3, 1984

Related U.S. Application Data

[63] Continuation of Ser. No. 335,764, Dec. 30, 1981, abandoned.

[51] Int. Cl.$^4$ .......................... B41F 5/16; B41F 13/12
[52] U.S. Cl. ...................................... 101/211; 101/181
[58] Field of Search .............. 101/181, 248, 426, 211; 356/429, 401, 400; 250/559, 561, 548, 571

[56] References Cited

U.S. PATENT DOCUMENTS

| | | | |
|---|---|---|---|
| 2,768,827 | 10/1956 | Noble | 101/181 |
| 2,840,370 | 6/1958 | Noble | 101/181 |
| 3,015,266 | 1/1962 | Anderson et al. | 101/181 |
| 3,033,109 | 5/1962 | Frommer | 101/181 |
| 3,701,464 | 10/1972 | Crum | 101/248 X |
| 4,003,660 | 1/1977 | Christie et al. | 356/429 |
| 4,022,534 | 5/1977 | Kishner | 356/210 |

FOREIGN PATENT DOCUMENTS 1053915  2/1954  France .

OTHER PUBLICATIONS

"New Improvements in Electronic Register System for Rotary Presses", Technical Association for the Graphite Arts 1979 Proceedings, pp. 92–104.

Primary Examiner—J. Reed Fisher
Attorney, Agent, or Firm—Morgan, Finnegan, Pine, Foley & Lee

[57] ABSTRACT

A method and apparatus for automatically sensing and maintaining registration of each of the color cylinders utilized in a multi-color printing press is disclosed.

Predetermined register marks are printed in the non-image areas on the sheet to be printed. Typically, in a four-color printing process, the black image is used as a reference, and registration of the other three image colors is achieved relative to the black image. Accordingly, a register mark for each process color is printed in the same location as a corresponding black reference register mark.

The reference register marks are configured such that the average reflectance of the printed overlay will change as the registration of the color image changes with respect to the black image. In general, the configuration of the register marks for the black and color images differs.

The reflectance of each printed overlay is measured on the printing press, while the sheet is moving. One type of sensor that can be used for this measurement is an on-press densitometer, or more generally, a reflectometer. If desired, the reflectance information obtained thereby can be converted to a registration error signal and used to achieve automatic, closed-loop control of the position of each of the color cylinders.

16 Claims, 9 Drawing Figures

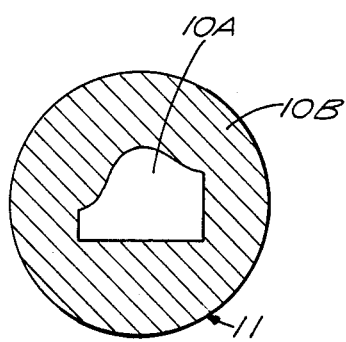 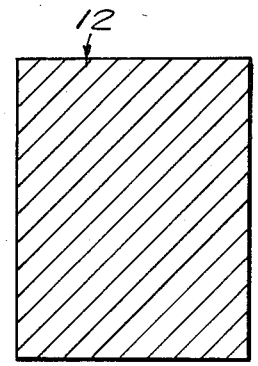
FIG. 2A   FIG. 2B
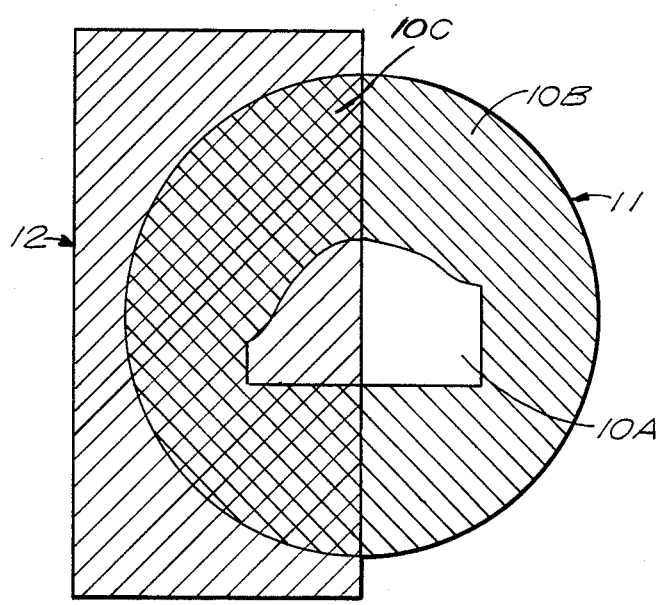
FIG. 2C

METHOD AND APPARATUS FOR SENSING AND MAINTAINING COLOR REGISTRATION

This is a continuation of application Ser. No. 335,764 filed Dec. 30, 1981, now abandoned.

BACKGROUND OF THE INVENTION

The present invention relates to a color registration system for a multi-color printing press. More specifically, it relates to a method and apparatus for sensing and maintaining the registration of each of the color printers utilized in conventional multi-color printing presses.

Three- and four-color process printing is closely allied with color photography. The fundamentals of color reproduction are much the same for all the printing processes. Just as a halftone printed in black on white paper is an optical illusion giving the observer the impression that he is seeing the various gradations of tone in the original photograph, a colored halftone gives the illusion that a wide range of colors is present. Actually, only three colors are used (black is added in the more commonly used four-color process). The halftone screens for each color are printed at differing angles, so that the dots fall one alongside another and overlap to form combinations of many colors. Inks for process printing are transparent tones of red, blue and yellow.

Since three plates (four for four-color process) must be obtained in order to print the proportionate parts of the different colors, first steps involve breaking down a colored original into three (or four) separate photographic images. These are termed separation negatives.

In one conventional method of producing separation negatives, the colored original is positioned before the lens of a large copying camera. Over the lens is placed an orange-red filter which allows light rays of that color only to pass. Thus, the red portions of the original are represented by tones of gray in the negative. In like manner, another piece of film is placed in the camera and another exposure made with a green filter over the lens. This negative now contains the green portion of the original. Again, a third piece of film is exposed through a deep-blue filter, this negative giving a record of the blue areas in the original.

Although it is theoretically possible to print the full range of tones using only the three process colors, operators usually include a black printer to add detail and contrast to the printed reproduction. To make the separation negative for the black printer, the same general procedure used for the other separation negatives is followed.

From each of the separation negatives, a positive print is made. A positive represents tonal values reversed from those in the negative, so the positive made from the red-filter negative will represent all colors except red, in other words, minus red. White light minus red leaves blue-green, the color in which this positive should be printed. In process work this color is called cyan. The green-filter negative produces a positive which must be reproduced in minus green, which is bluish-red or magenta. The blue-filter negative in turn gives a positive which must be printed as minus blue, or yellow. When the three positives are brought together one over the other in exact alignment, the original subject is recreated.

The steps followed from the breaking down of a colored original into separation negatives to the generation of combined positive prints vary according to the particular graphic arts process used. For example, in offset lithography the separation negatives are each photographed through a halftone screen to give a screened positive from which three (or four) printing plates are made. These plates are printed, superimposed in register, for the proper color of the final reproduction.

Thus, although there are numerous types of designs of printing presses, most share the problem of having to print multiple single-color images in the same area in order to achieve the final, multi-colored result. Accordingly, for a high quality final product to be achieved these multiple single-color images must be accurately located, or registered, with respect to one another. The tolerable error with respect to ideal register depends on the particular application, but is often in the range of 0.001".

In order to achieve proper register, the printing press operator must make appropriate mechanical adjustments of the printing press. Moreover, adjustments must be made to achieve registration in both the longitudinal (i.e., in the direction of paper motion) and lateral dimensions. Once initial registration is achieved in the make-ready phase of press operation, the relative registration of the separate color images is likely to change as the printing press runs. Typical causes of this misregistration include fluctuations in the speed of operation, changes in ambient conditions and varying characteristics of the print substrate.

It is apparent that once the printing press is running, the effect of misregistration is to degrade the sharpness and color quality of the final printed image. Accordingly, it is of advantage to be able to determine the degree of registration quite often during the running of the press, in order that slight misregistration be sensed and corrected before it becomes intolerable. Once information as to the relative registration of the single-color images is available, the printing press can be adjusted, either manually or automatically, to correct any misregistration.

Known color registration sensing methods utilize sensors that operate by the measurement of register marks printed along with the color images. This class of sensors embodies the basic principle that longitudinal registration errors result in a change in the relative times at which the register marks are measured by the sensor. In one known implementation, lateral registration is determined by measuring the relative timing of two kinds of register marks, one perpendicular to and one skew to the direction of paper motion. Both marks must be measured before lateral registration can be determined, since the timing of the skew mark is dependent upon both the longitudinal and lateral registration.

There are several limitations and drawbacks associated with the knowncolor registration measurement methods. Specifically, they do not provide for independent measurement of registration in two dimensions. Lateral registration measurement requires that longitudinal registration first be measured, and its value used to compute lateral registration. Thus, errors in measuring longitudinal registration will affect the determination of lateral registration.

Moreover, they require knowledge of paper speed, since they are based on measuring the relative timing of register marks. Errors in determining paper speed can therefore introduce errors into the measurement of registration.

And finally, they can be adversely affected by the effects of fill-in and slur on the printed registration marks, and do not compensate for such adverse effects.

It is accordingly a general object of the present invention to provide a method and apparatus for sensing and maintaining the registration of each of the color printers utilized in conventional multi-color printing presses. More specifically, it is an object of the invention to overcome the aforementioned limitations and drawbacks associated with the known techniques.

It is a particular object of the invention to provide a color registration sensing method that independently senses longitudinal and lateral registration.

It is another object of the invention to provide a color registration sensing method that does not require knowledge of paper speed.

It is still another object of the invention to provide a color registration sensing method that compensates for the potentially adverse effects of fill-in and slur on the printed register marks.

It is a further object of the invention to provide a color registration sensing method whereby the sensitivity of the registration measurement and the range of registration that can be sensed can be changed through the choice of register marks.

Other objects will be apparent in the following detailed description and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a method and apparatus for sensing and maintaining the color registration of a printing press.

In accordance with the teachings of the invention, predetermined reference register marks are printed at predetermined locations in the non-image areas of a substrate to be printed such that there is at least one reference register mark for each of the process colors whose registration is to be sensed. A corresponding number of color register marks for each of the process colors are printed in the same location as their corresponding reference register marks. The average reflectance of each of the overlays of reference and color register marks is measured.

The average reflectance is representative of the registration of the process colors being printed. The reflectance information is readily converted to a registration error signal and utilized to achieve closed-loop control of the individual color cylinders employed to print the process colors.

The effects of printing press variables, such as varying reflectance of the black and color inks, as well as slur and fill-in variations, are compensated by measuring the reflectance of diagnostic patterns, or color bars, which provide quantitative information about the above described variations. This information is used to largely remove the effects of press variations from the registration error signal.

BRIEF DESCRIPTION OF THE DRAWINGS

Serving to illustrate an exemplary embodiment of the invention are the drawings of which:

FIG. 2A illustrates a typical configuration of a black reference register mark;

FIG. 2B illustrates a typical configuration of a color register mark;

FIG. 2C illustrates an overlay of the typical register marks illustrated in FIGS. 2A and 2B;

FIG. 7 illustrates the form of color bars used to measure slur and fill-in.

DETAILED DESCRIPTION OF THE PREFERRED EMBODIMENT

The present invention utilizes measurements of the average reflectance of overlayed register marks to effect automatic registration of the different process colors employed in a multi-color printing press. Typically, a reference register mark is associated with the color black and a color register mark is associated with each process color to be printed. Thus, in a typical four-color system, there would be at least one black reference register mark for each of the process colors (cyan, magenta and yellow). In addition there would be at least one color register mark corresponding to each of the process colors. Registration of the color register marks is achieved relative to the corresponding black register marks.

Figure 1:
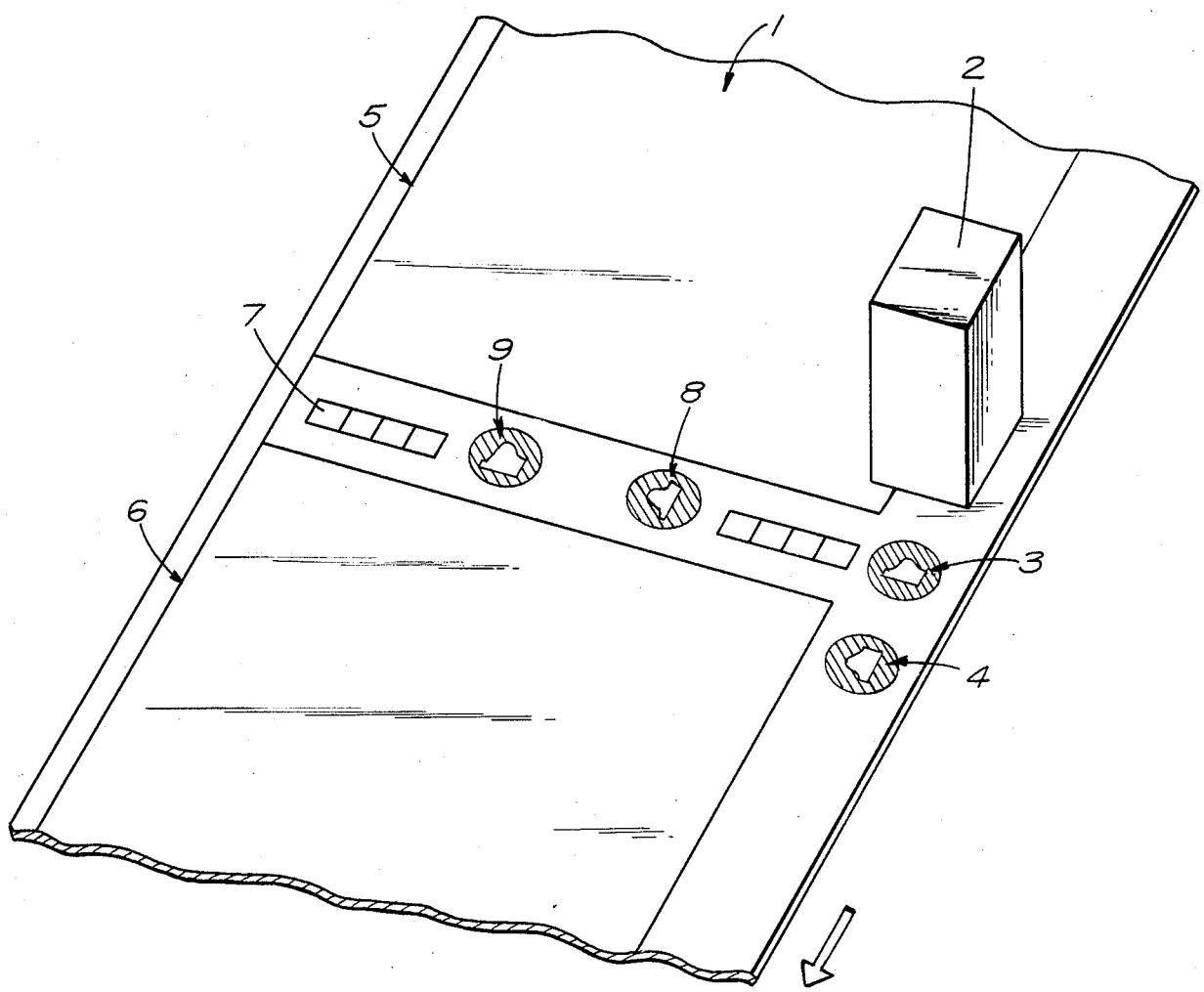
FIG. 1 illustrates typical ways in which reference register marks, in accordance with the present invention, can be printed in non-image areas on a substrate to be printed upon.

Referring now to FIG. 1, the manner in which reference register marks having a predetermined configuration can be printed in predefined non-image areas on a substrate to be printed, either on a web or sheet-fed printing press, is illustrated. As shown therein, the substrate 1 is moving, in the direction of the solid arrow, typically at speeds up to 3000 ft/min, depending upon the type of printing press. A reflectometer 2, such as described in U.S. Pat. No. 4,022,534 assigned to one of the assignees of the present invention, is disposed above the substrate, in such a position as to measure the reflectance of selected portions of the substrate. Two reference register marks 3,4 are printed along the margin of the substrate and can be measured sequentially by the reflectometer 2. Additionally, reference register marks can be printed between consecutive impressions 5,6. It is often the case that a set of color bars 7 is printed in this region, and is measured by the reflectometer 2, as it is translated laterally across the printed substrate. Two reference register marks 8,9 are shown printed adjacent to the color bars. As with the reference register mark, the color register mark can be printed along the margin of the substrate, or adjacent to the color bars.

Color bars are diagnostic patterns printed in non-image areas for the purpose of quality control of certain aspects of the printing process. Representative patches of solid ink of the process color inks can be monitored by the reflectometer 2 in order to sense variations in the flow of ink. Screened patterns can also be included so that variations in the ability of the printing press to maintain predetermined halftone dot sizes can be monitored. Additionally, further special color bar patterns can be used to sense such printing variables as slur and fill-in. Slur is defined as a directional change in the area of a printed halftone dot, and occurs in the direction of paper travel through the press. Fill-in is a radial increase in dot size compared to the film. Both of these variations will affect the size of halftone dots. However, they also have an effect on printed register marks, as will be described in a later section. The black reference register marks as well as the color register marks can be considered to be additional types of color bars, to be used for measurement and control of registration, an important printing press variable.

The printing of color bars is achieved by including them in the artwork used for each of the color separations. Thus, all black color bars or components of color bars are included in the black separation. These black color bars bear a fixed geometrical relationship to the black image area. Likewise, the cyan, magenta and yellow color bars are included in the corresponding artwork for the cyan, magenta and yellow separation images. As a result of the fixed geometrical relationship of each color bar to the corresponding color image artwork, the printed color bars bear the same geometrical relationship to the corresponding color images. Thus, as the location of each color image varies with respect to the black image, the process color bar locations vary in the same fashion relative to the black color bars. Since the registration color bars are overlays of each process color and black, relative motion of the color and black images alters the detailed structure of the overlay of register marks. The above-mentioned geometrical relationship between color bars and the printed image is necessary only for color bars used as register marks.

It is not always practical to measure more than one color bar per printed impression. However, since registration usually changes slowly between impressions, acquisition of measurements from different impressions can be relied upon for the measurement of registration. Measurements of other diagnostic color bar information can be averaged for the case when printing variables are changing from impression-to-impression, but it is the underlying average value that is needed.

Referring to FIG. 2A, a reference register mark 11 having a predetermined configuration and which is printed with the black printer is illustrated. As shown therein, it consists of an open, or clear, area 10A, surrounded by a solid region 10B having a circular boundary.

The configuration of the color register marks 12 corresponding to each of the color printers (i.e., cyan, magenta, and yellow) is illustrated in FIG. 2B. As illustrated, the color register marks 12 consist of a solid, rectangular region. In order to enable the measurement of register, the color register mark 12 shown in FIG. 2B must be printed in the same position a the black reference mark 11 shown in FIG. 2A.

FIG. 2C illustrates a representation of such an overlay with no misregistration between the black and color images associated with the reference 11 and color register marks 12, respectively.

Figure 3:
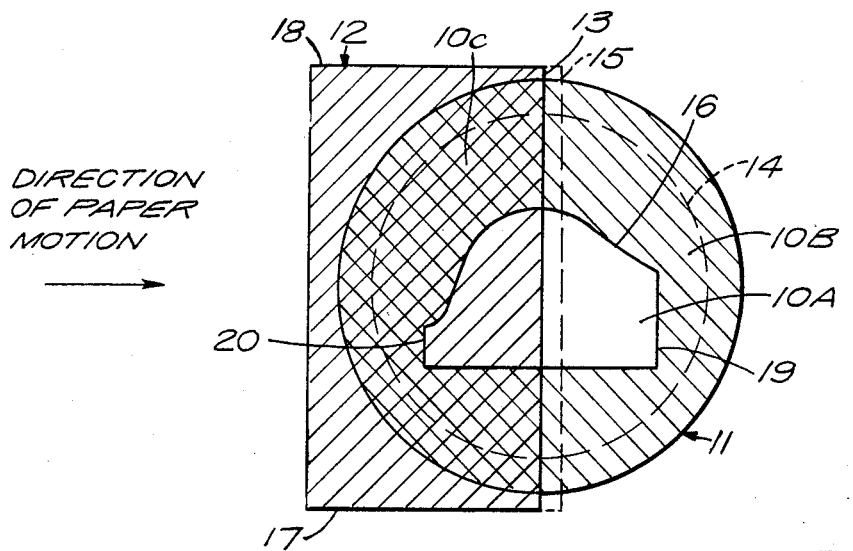
FIG. 3 illustrates a method for sensing registration in the longitudinal dimension.

Referring now to FIG. 3, the manner in which the overprinted register patterns can be used to measure registration is illustrated. As shown therein, the color register mark 12 has a right-hand boundary 13 that defines the amount of clear area 10A of the reference register mark 11 that is covered by the solid color ink. The circular boundary 14 denotes the perimeter of the region for which reflectance is measured by the reflectometer. The reflectance of the region within the boundary 14 is the area-weighted sum of four subregions: (1) clear area 10A of the reference register mark 11 not covered by solid color ink of the color register mark 12; (2) clear area 10A of the reference register mark 11 covered by solid color ink of the color register mark 12; (3) black ink area 10B of the reference register mark 11 not overlayed with solid color ink of the color register mark 12; and (4) black ink area 10B of the reference register mark 11 overlayed with solid color ink of the color register mark 12.

It is observed that if the color register mark 12 is moved towards the right, moving its right-hand boundary 13 to position 15, then the areas of these four subregions will change, resulting in a decrease of average reflectance. Similarly, it is noted that the shape of the upper curved boundary 16 of the clear area 10A of the reference register mark 11 has an effect on the change in average reflectance.

When the registration error is large enough that the right-hand boundary 13 of the color register mark 12 reaches the right-hand edge 19 of the clear area 10A of the reference register mark 11, then any further reduction in average reflectance is small. Indeed, if the reflectances of the solid black 10B and solid color areas of the reference register mark 11 and color register mark 12, respectively, are zero, then the reflectance will undergo no more reduction as the right-hand boundary 13 of the color register mark 12 moves past the right-hand edge 19 of clear area 10A of the reference register mark 11.

Likewise, for a displacement of the color register pattern toward the left, the average reflectance will increase until the right-hand boundary 13 of the color register mark 12 reaches the left-hand edge 20 of the clear area 10A of the reference register mark 11. Beyond this point, reflectance will increase slowly, if at all.

It should be clear that the average reflectance measured by the reflectometer will be a monotonic function of registration and will vary at least over the horizontal extent of the clear area 10A of the reference register mark 11, as measured from left-hand edge 20 to right-hand edge 19. Accordingly, the measured value of average reflectance can be used as an error signal in a registration control system, since the reflectance measurement will give an indication of the direction and the degree of misregistration.

Figure 4:
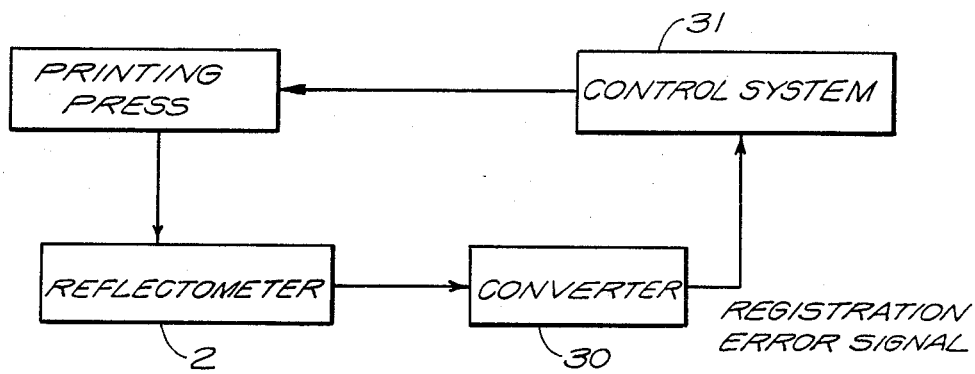
FIG. 4 illustrates a block diagram of a registration control system.

Referring now to FIG. 4, a registration control system is illustrated. As shown therein, conventional electronic means 30, such as a microcomputer, is utilized to convert the measured value of average reflectance to a registration error signal which is then inputted to a conventional analog or digital closed-loop control circuit 31, interfaced to the printing press cylinder registration mechanism, thereby effecting automatic color registration of the process color printer whose color registration is being sensed.

Referring again to FIG. 3, it is noted that choice of the shape and size of the clear area 10A of the black reference register mark 11 will affect the extent over which the error signal will vary, as well as the rate of change of the error signal. The rate of change will affect the sensitivity of the technique.

It is also noted that for vertical motion of the color register mark 12, there will be no change in average reflectance until the lower 17 or upper 18 boundary of the color register mark crosses the circular boundary 14 that defines the region over which reflectance is measured. More specfically, the setup shown in FIG. 3 is configured to sense registration errors in the longitudinal dimension. For small lateral registration errors, it is insensitive. A similar pair of register marks, rotated 90°, would be used to sense registration errors in the lateral dimension.

It is noted further that errors in the location of the circular boundary 14 will have a small effect on the measured results, so long as the boundary neither extends out of the black area 10B or into the clear area 10A of the reference register mark 11. This is because the contribution to average reflectance from the black regions 10B and black and color overprint 10C is small, and so changes in the black region result in small average reflectance changes. Errors in the location of the boundary 14 can result from inaccuracies in positioning the reflectometer relative to the register marks.

Figure 5:
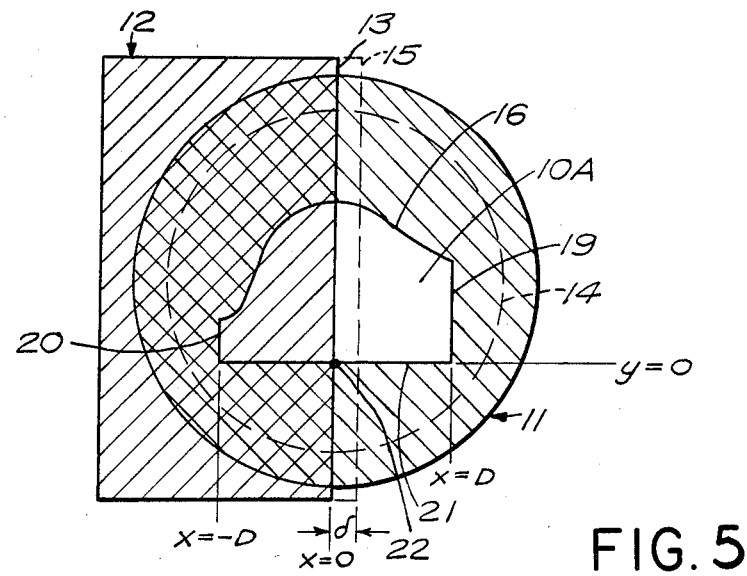
FIG. 5 illustrates in greater detail certain aspects of FIG. 3.

A more rigorous mathematical treatment of the present invention is given with reference to FIG. 5. As shown therein, an (x,y) coordinate system is defined such that the lower boundary 21 of the clear area 10A of the reference register mark 11 lies along the x-axis, with the origin 22 at its center. As illustrated, the lower boundary 21 extends from $x=-D$ to $x=D$. The left- and right-hand boundaries 20,19, respectively, are parallel to the y-axis and extend from $y=0$ in the positive y-direction. Thus, when the color register mark 12 is misregistered by an amount $+\delta$ (as when its right-hand boundary 13 moves to location 15), the average reflectance within the circular boundary 14 is given by:

$$R_{avg} = r_c \int_{-D}^{\delta} f(x)dx + r_p \int_{\delta}^{D} f(x)dx + r_{cb}\left\{ \frac{\pi\rho^2}{2} + \left[\delta\sqrt{\rho^2 - \delta^2} + \rho^2 \sin^{-1}\left(\frac{\delta}{\rho}\right)\right] - \int_{-D}^{\delta} f(x)dx \right\} + r_b\left\{ \frac{\pi\rho^2}{2} - \left[\delta\sqrt{\rho^2 - \delta^2} + \rho^2 \sin^{-1}\left(\frac{\delta}{\rho}\right)\right] - \int_{\delta}^{D} f(x)dx \right\} \quad (1)$$

where
$r_c$ = reflectance of color printed on paper
$r_p$ = reflectance of paper
$r_{cb}$ = reflectance of color overlayed with black
$r_b$ = reflectance of black printed on paper
$\rho$ = radius of measured area included in circular boundary 14
$f(x)$ = functional form of the shape of the upper boundary 16 of the black reference register mark For purposes of illustration, assume that the reflectance of the black ink is sufficiently small that it can be ignored. Then setting $r_b = r_{cb} = 0$ in equation (1), results in:

$$R_{avg} = r_c \int_{-D}^{\delta} f(x)dx + r_p \int_{\delta}^{D} f(x)dx \quad (2)$$

The rate of change of the average reflectance as a function of misregistration $\delta$ determines the sensitivity of the error signal to registration errors. This rate of change is found by differentiating equation (2) with respect to $\delta$:

$$\frac{dR_{avg}}{d\delta} = r_c \frac{d}{d\delta}\int_{-D}^{\delta} f(x)dx + r_p \frac{d}{d\delta}\int_{\delta}^{D} f(x)dx \quad (3)$$

$$= (r_c - r_p) f(\delta)$$

Thus, from equation (3), it is seen that the functional form of the rate of change of the error signal (i.e., sensitivity) is exactly the same as the functiona form f(x) that defines the shape of the black reference register mark. Thus, it is clear that the configuration of the register marks affects the sensitivity of the technique. The sensitivity is also seen to be proportional to the difference between paper and colored ink reflectance. It is, therefore, of advantage to maximize this difference by designing the reflectometer with color selection filters that minimize the measured reflectance of the colored ink. Of course, equation (3) is not strictly true because of the assumption that $r_b = r_{cb} = 0$. However, it does help to describe how the sensitivity of registration measurement is affected by the configuration of the reference register mark.

The method of sensing registration described above does not necessarily require the use of register marks having the configurations illustrated in FIGS. 2A and 2B. Any shape of clear area with a black surround can be used for the black reference register mark. Similarly, the color register mark can also have any complex shape, so long as the average reflectance of the overlay is a monotonic function of misregistration.

However, unless the color register mark is constant in one dimension, the method is not independent of misregistration in that dimension.

Additionally, the black reference register mark can consist of a black region with a clear surround, but this configuration is more sensitive to errors in positioning the boundary 14, and so is not to be preferred.

Figure 6:
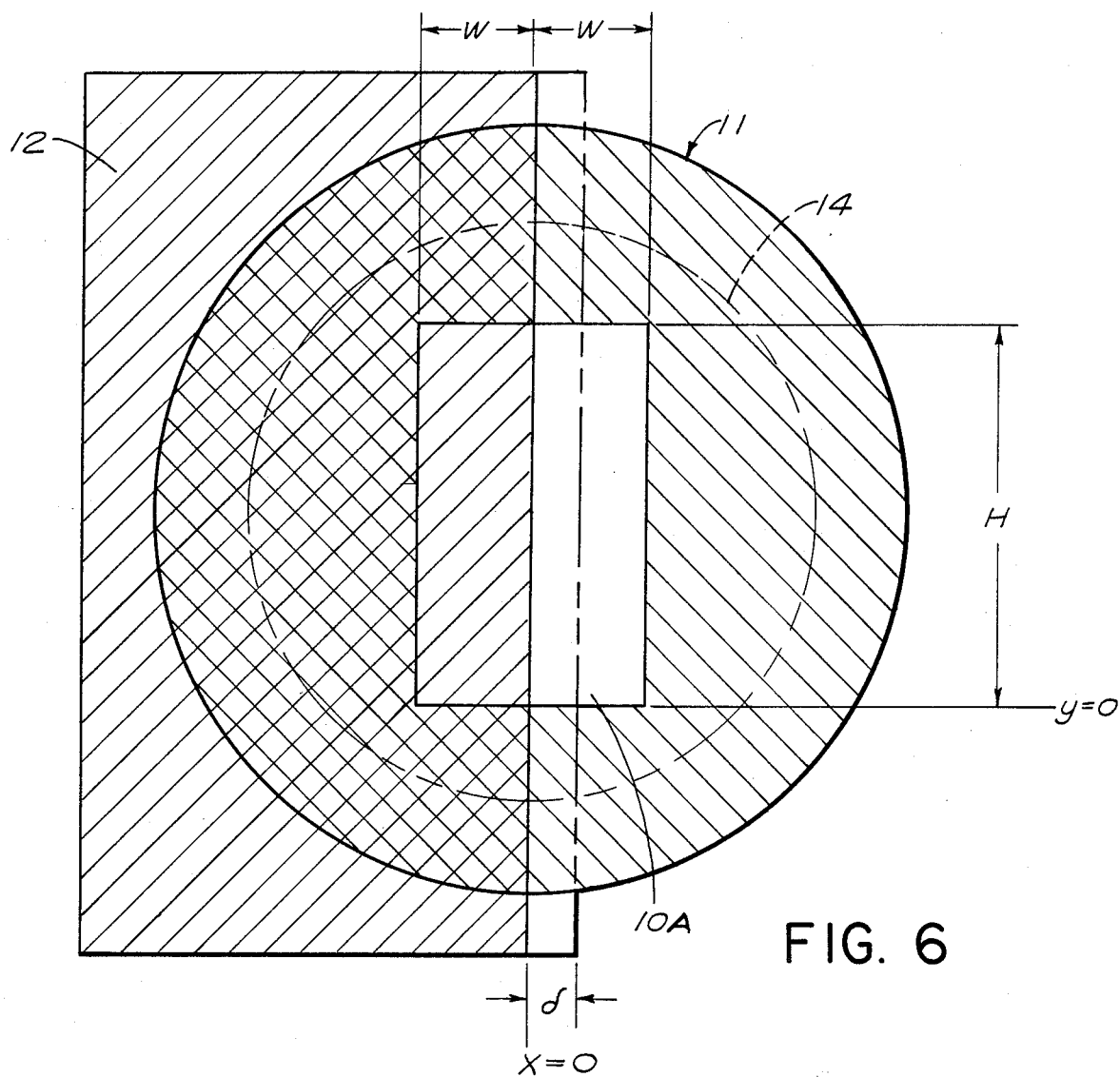
FIG. 6 illustrates a black reference register mark consisting of a clear rectangle with black surround and overlayed color register mark.

One of the simplest forms the black reference register mark can take is that of a clear rectangle with black surround. This register mark is shown in FIG. 6, with the color register mark 12 overlayed. For no misregistration ($\delta = 0$), the clear area 10A of the black reference register mark 11 is half-covered by the color register mark 12. The functional form of the black register mark 11 is given by the following expression:

$$f(x) = H, \quad |x| \leq W \quad (4)$$

The rate of change or sensitivity of the error signal is found from equation (3) to be:

$$\frac{dR_{avg}}{d\delta} = (r_c - r_p)H, \quad |x| \leq W$$

which is constant over the range $|x| \leq W$. This rate of change cannot be made any larger without increasing the height H of the black reference register mark 11.

This dimension is limited by the size of the measured area 14.

Thus, one cannot exceed the sensitivity of a rectangular reference register mark 11 of height H with any other shaped mark of maximum y-dimension H. For this reason as well as the fact that the rectangular mark is of simple form, the rectangular mark is the preferred configuration of the black reference register mark 11.

It should be noted that the height H of the rectangular reference register mark shown in FIG. 6 can be increased so that it extends beyond the boundary 14 of the measured area, or even to the outside boundary of the solid black area. Since registration is being measured in a dimension parallel to the width of the rectangle, then the above-described reference register mark will achieve the purposes of the invention. However, this type of reference register mark will result in a registration control system that is more sensitive to errors in positioning of the measured area along the dimension for which registration is to be sensed. This error arises primarily because of changes in the size and shape of the unprinted (clear) area that lies within the measured area, since the upper and lower boundaries are defined by the measured area. For these reasons, it is recommended that the clear area of the reference register mark be completely enclosed within the measured area.

It should also be noted that the roles of the black reference and color register marks, as shown in FIG. 6, can be reversed. That is, the black reference register marks can be solid rectangles of the same form as the color register mark 12 in FIG. 6. The color register marks can be a clear rectangle surrounded by solid color, of the same form as the black reference register mark 11 in FIG. 6. The same argument is applicable to the more general form of the register marks, as shown in FIG. 5.

Variations in the reflectance (or optical density, where density is the negative logarithm of reflectance) of the solid black and color inks will occur on a printing press, and will affect the measured reflectance of the overlay of register marks. Since the effect of such variations on the average reflectance is predictable, measurement of the reflectance of solid patches of the black and color inks can be used to compensate for such variations. Solid patches of the inks are therefore included with the color bars in a non-image area. The equation used to compensate for density variations is given after a discussion of slur and fill-in (see equation 14).

Slur and fill-in are two more press variables that can adversely affect the register marks. Their effect on dots was previously described. However, slur can shift the position of a trailing edge, and fill-in can shift the position of both leading and trailing edges. These effects can change the structure of the register marks, and can vary independently for the different printing units of a multicolor press. The effects of slur and fill-in can therefore result in a change of average reflectance, thereby introducing an error into the registration sensing method.

For example, if the paper is moving toward the left in FIG. 6, the trailing edges (the left-hand border of the reference register mark 11 and the right-hand edge of the color regiser mark 12) can be shifted toward the right by slur and fill-in, and the leading edge (the right-hand edge of the reference register mark 11) can be shifted toward the left by fill-in. In addition, the top and bottom edges of the reference register mark can be shifted by fill-in toward the clear area. As a result, the clear area 10 that is not overlayed with the color regiser mark will decrease in size, so that the average reflectance of the overlay will decrease. This result is indistinguishable from a positive registration error, for which the color register mark will shift towards the right, and the average reflectance will decrease. Without compensation, then slur and fill-in can limit the accuracy to which registration can be sensed.

Figure 7:
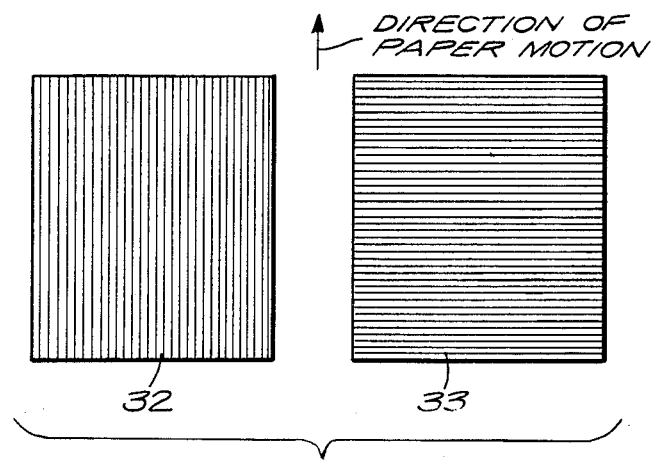

Compensation for slur and fill-in can be accomplished by using particular color bar patterns designed for measurement of these variables. See, e.g., Milton Pearson, et al., "Instrumentation for the Measurement of Slur and Fill-in on a Lithographic Web Press", Technical Association of the Graphic Arts Proceedings, 1979, p. 162. These patterns are shown in FIG. 7. The patterns consist of linear bars, with bar width equal to bar spacing. One pattern 32 is printed with the bars parallel to the direction of paper motion, and is used to sense the effect of fill-in in the lateral dimension. The other pattern 33 is printed with the bars perpendicular to the direction of paper motion, and is used to sense the effect of slur and fill-in in the longitudinal dimension. In either dimension, the effect of slur and/or fill-in is to broaden the width of the printed bars. The reflectance of these two patterns will decrease as the effects of slur and fill-in are introduced. The actual increase in line width can be found by measuring the reflectance of the two slur patterns described above using an on-press densitometer or reflectometer, and the following equations from the Pearson reference:

$$\text{Relative area of printed parallel lines} = A_\| = \frac{1 - 10^{-D_\|/n}}{1 - 10^{-D_s/n}} \quad (6)$$

$$\text{Relative area of printed perpendicular lines} = A_\perp = \frac{1 - 10^{-D_\perp/n}}{1 - 10^{-D_s/n}} \quad (7)$$

$$\text{Relative area of parallel lines on film} = A_{f\|} = 10^{-D_{n\|}} \quad (8)$$

$$\text{Relative area of perpendicular lines on film} = A_{f\perp} = 10^{-D_{n\perp}} \quad (9)$$

$$\text{Fill-in (mm)} = F = \frac{25.4}{150}(A_\| - A_{f\|}) \quad (10)$$

$$\text{Slur (mm)} = S = \frac{25.4}{150}(A_\perp - A_\| + A_{f\|} - A_{f\perp}) \quad (11)$$

where $D_\|$ = Optical Density of Parallel Lines
$D_\perp$ = Optical Density of Perpendicular Lines
$n = 1.7$
$D_{n\|}$ = Optical Density of Negative Film of Parallel Lines
$D_{n\perp}$ = Optical Density of Negative Film of Perpendicular Lines Equations (8) and (9) can be alternately expressed as:

$$A_{f\|} = 1 - 10^{-D_{p\|}} \quad (12)$$

$$A_{f\perp} = 1 - 10^{-D_{p\perp}} \quad (13)$$

where $D_{p\|}$ and $D_{p\perp}$ are measured from positive film.

The measurements of slur and fill-in can be converted to changes in the dimensions of the clear area of the overlay of register marks. Referring to FIG. 6, we consider four cases:

1. Paper motion to left
2. Paper motion to right
3. Paper motion upward
4. Paper motion downward The direction of motion of the paper relative to the register marks will determine which edges are leading and trailing edges, and which edges are sensitive to registration errors. For cases 1 and 2, the overlay is designed to sense registration. For cases 3 and 4, the overlay is independent of registration errors in the direction perpendicular to the direction for which the overlay is designed. The decrease dx and dy in dimensions x and y of the reference register mark rectangle, and the shift ds in the edge of the color register mark, are tabulated below:

|  | dx | dy | ds |
| --- | --- | --- | --- |
| Case 1 | $F_{k/2}$ | $F_k$ | $F_{s/2} + S_s$ |
| Case 2 | $F_{k/2} + S_k$ | $F_k$ | $F_{s/2}$ |
| Case 3 | $F_{k/2}$ | $F_k + S_k$ | $F_{s/2}$ |
| Case 4 | $F_{k/2}$ | $F_k + S_k$ | $F_{s/2}$ | where
$F_k$ = Fill-in for black reference register mark
$S_k$ = Slur for black reference register mark
$F_s$ = Fill-in for color register mark
$S_s$ = Slur for color register mark The reductions in dimension of the clear area of the overlay of register patterns can be accounted for in the calculation of registration error $\Delta r$. Registration error $\Delta r$ can be expressed as follows:

$$\Delta r = \frac{A_o 10^{-D} - (2-dy)[R_w(0.5-dx-ds) + R_s(0.5-dx+ds)]}{(2-dy)(R_s-R_w) + (1+dy)(R_{ks}-R_k)} \quad (14)$$

$$\frac{(R_k + R_{ks})\left[\frac{A_o}{2} - (0.5-dx)(2-dy)\right]}{(2-dy)(R_s-R_w) + (1+dy)(R_{ks}-R_k)}$$

where
D = Measured optical density of overlay of color and reference register marks
$R_w$ = Reflectance of substrate (usually white paper)
$R_k$ = Reflectance of solid black ink (from solid color patch)
$R_{ks}$ = Reflectance of overprint of solid black and color inks (from patch having overlay of solid inks)
$R_s$ = Reflectance of solid color ink (from solid color patch)
$A_o$ = Area of measured sample field The above description of the preferred embodiment is examplary and should not be considered as limiting the scope of the present invention which is defined by the following claims.

What is claimed is:

1. A method for sensing the color registration of a multi-color printing press having a printer for a reference color, a printer for a first process color, a printer for a second process color, and a printer for a third process color comprising the steps of:

(a) printing with the reference color printer at predetermined locations in the non-image areas of a sheet to be printed at least one reference register mark corresponding to each of the first, second and third process colors, each of said reference register marks being comprised of a reference color area and a clear area;

(b) overlaying each of the reference register marks corresponding to the first process color with a corresponding first process color register mark, each of said first process color register marks being comprised of a first process color area;

(c) measuring a single value of average reflectance for each overlay of said reference and first process color register marks, said single value of average reflectance being measured at a single point in time over the entirety of a first region comprised of a plurality of subregions formed as the result of said overlaying of said reference and first process color register marks, said subregions being comprised of a clear subregion having an area equal to the clear area of the reference register mark corresponding to the first process color overlay to the extent said clear area is not overlayed by said first process color area, a reference color subregion having an area equal to a portion of said reference color area within said first region to the extent said portion is not overlayed by said first process color area, a first process color subregion having an area equal to said clear area to the extent said clear area is overlayed by said first process color area, and an overlay subregion having an area equal to said portion of said reference color area within said first region to the extent said portion is overlayed by said first process color area, said average reflectance being a monotonic function of the registration of the first process color, each of said measured single values of average reflectance being an area-weighted sum of the reflectance of said subregions and representative of the registration of said first process color;

(d) overlaying each of the reference register marks corresponding to the second process color with a corresponding second process color register mark, each of said second process color register marks being comprised of a second process color area;

(e) measuring a single value of average reflectance for each overlay of said reference and second process color register marks, said single value of average reflectance being measured at a single point in time over the entirety of a second region comprised of a plurality of subregions formed as the result of said overlaying of said reference and second process color register marks, said subregions being comprised of a clear subregion having an area equal to the clear area of the reference register mark corresponding to the second process color overlay to the extent said clear area is not overlayed by said second process color area, a reference color subregion having an area equal to a portion of said reference color area within said region to the extent said portion is not overlayed by said second process color area, a second process color subregion having an area equal to said clear area to the extent said clear area is overlayed by said second process color area, and an overlay subregion having an area equal to said portion of said reference color area within said region to the extent said portion is overlayed by said second process color area, said average reflectance being a monotonic function of the registration of the second process color printer, each of said measured single values of average reflectance being an area-weighted sum of the reflectance of said subregions and representative of the registration of said second process color;

(f) overlaying each of the reflectance register marks corresponding to the third process color with a corresponding third process color register mark, each of said third process color register marks being comprised of a third process color area;

(g) measuring a single value of average reflectance for each overlay of said reference and third process color register marks, said single value of average reflectance being measured at a single point in time over the entirety of a third region comprised of a plurality of subregions formed as the result of said overlaying of said reference and third process color register marks, said subregions being comprised of a clear subregion having an area equal to the clear area of the reference register mark corresponding to the third process color overlay to the extent said clear area is not overlayed by said third process color area, a reference color subregion having an area equal to a portion of said reference color area within said region to the extent said portion is not overlayed by said third process color area, a third process color subregion having an area equal to said clear area to the extent said clear area is overlayed by said third process color area, and an overlay subregion having an area equal to said portion of said reference color area within said region to the extent said portion is overlayed by said third process color area, said average reflectance being a monotonic function of the registration of the third process color, each of said measured single values of average reflectance being an area-weighted sum of the reflectance of said subregions and representative of the registration of said third process color;

(h) converting each of the measured single values of average reflectance representative of the registration of the first, second and third process color printers to a first, second and third registration error signal, respectively, using a predefined equation;

(i) inputting the first, second and third registration error signals into a closed-loop control system operatively connected to a printing press cylinder registration mechanism of each of the first, second and third process colors to adjust each of said mechanisms, and thereby automatically maintain the registration of the first, second and third process colors;

(j) printing at predetermined locations in the nonimage areas of the sheet at least one solid patch for each of the reference, first, second and third process colors;

(k) measuring the reflectance of each of said solid patches, and thereby, of said reference, first, second and third process colors;

(1) compensating for variations in the reflectance of said reference, first, second and third process colors in converting said single values of average reflectance into said first, second and third registration error signals;

(m) printing at predetermined locations in the nonimage areas of the sheet for each of the reference and first, second and third process colors;

(1) at least one first color bar pattern comprised of a plurality of linear bars parallel to the direction of motion of the paper, each of said bars having a width equal to the spacing between said bars, and (2) at least one second color bar pattern comprised of a plurality of linear bars perpendicular to the direction of motion of the paper, each of said bars having a width equal to the spacing between said bars, (n) measuring the reflectance of each of said first and second color bar patterns, said reflectance of said first color bar pattern being representative of fill-in, said reflectance of said second color bar pattern being representative of slur; and (o) compensating for variations in said reflectances, and thereby, said fill-in and slur in said reference, first, second and third process colors in converting said single values of average reflectance into said first, second and third registration error signals.

2. A method as recited in claim 1 wherein each of said reference register marks consists of a closed clear area within a solid reference color surround, each of said first process color register marks consists of a closed solid region of corresponding color ink; each of said second process color register marks consists of a closed solid region of corresponding color ink; and each of said third process color register marks consists of a closed solid region of corresponding color ink.

3. A method as recited in claim 1 wherein each of said reference register marks consists of a closed solid reference color area within a clear surround, each of said first process color register marks consists of a closed solid region of corresponding color ink; each of said second process color register marks consists of a closed solid region of corresponding color ink; and each of said third process color register marks consist of a closed solid region of corresponding color ink.

4. A method as recited in claim 2 wherein the closed clear area of each of said reference register marks has one border consisting of a substantially straight line, said border being oriented substantially parallel to the direction in which registration is to be sensed; each of said first process color register marks is configured in the shape of a rectangle, said rectangle being oriented such that one edge thereof is substantially perpendicular to the direction in which registration is to be sensed; each of said second process color register marks is configured in the shape of a rectangle, said rectangle being oriented such that one edge thereof is substantially perpendicular to the direction in which registration is to be sensed; each of said third process color register marks is configured in the shape of a rectangle, said rectangle being oriented such that one edge thereof is substantially perpendicular to the direction in which registration is to be sensed.

5. A method as recited in claim 4 wherein the closed clear area of each of said reference register marks is rectangular in shape.

6. A method as recited in claim 1 wherein said predefined equation is an algebraic expression for each of said registration error signals as a function of the corresponding measured single values of average reflectance, and the reflectance of said reference color, of one of said process colors, of the paper and of an overlay of said process color and said reference color.

7. A method as recited in claim 1 wherein said predefined equation is an algebraic expression for each of said registration error signals as a function of the corresponding measured single value of average reflectance, and the reflectance of said reference color, of one of said process colors, of the paper, and of an overlay of said process color and said reference color, and the amount of slur and fill-in of said reference color and said process color.

8. A method for automatically maintaining the color registration of a multi-color printing press having a printer for the color black, a printer for the color cyan, a printer for the color magenta and a printer for the color yellow comprising the steps of:

(a) printing with the black printer at predetermined locations in the non-image areas of a sheet to be printed at least one reference register mark corresponding to each of the colors cyan, magenta and yellow, each of said reference register marks being comprised of a black area and clear area;

(b) overlaying using the cyan printer each of the black reference register marks corresponding to the color cyan with a corresponding cyan register mark, each of said cyan register marks being comprised of a cyan color area;

(c) measuring a single value of average reflectance for each overlay of said black reference and cyan register marks, said single value of average reflectance being measured at a single point in time over the entirety of a first region comprised of a plurality of subregions formed as the result of said overlaying of the black reference and cyan register marks, said subregions being comprised of a clear subregion having an area equal to the clear area of the black reference register mark corresponding to the cyan overlay to the extent said clear area is not overlayed by said cyan color area, a black subregion having an area equal to a portion of said black area within said first region to the extent said portion is not overlayed by said cyan color area, a cyan subregion having an area equal to said clear area to the extent said clear area is overlayed by said cyan color area, and an overlay subregion having an area equal to said portion of said black area within said first region to the extent said portion is overlayed by said cyan color area, said average reflectance being a monotonic function of the registration of the color cyan, each of said measured single values of average reflectance being an area-weighted sum of the reflectance of said subregions and representative of the registration of said color cyan;

(d) overlaying using the magenta printer each of the black reference register marks corresponding to the color magenta with a corresponding magenta register mark, each of said magenta register marks being comprised of a magenta color area;

(e) measuring a single value of average reflectance for each overlay of said black reference and magenta register marks, said single value of average reflectance being measured at a single point in time over the entirety of a second region comprised of a plurality of subregions formed as the result of said overlaying of the black reference and magneta register marks, said subregions being comprised of a clear subregion having an area equal to the clear area of the black reference register mark corresponding to the magenta overlay to the extent said clear area is not overlayed by said magenta color area, a black subregion having an area equal to a portion of said black area within said second region to the extent said portion is not overlayed by said magenta color area, a magenta subregion having an area equal to said clear area to the extent said clear area is overlayed by said magenta color area, and an overlay subregion comprised of said portion of said black area within said second region to the extent said portion is overlayed by said magenta color area, said average reflectance being a monotonic function of the registration of the color magenta, each of said measured single values of average reflectance being an area-weighted sum of the reflectance of said subregions and representative of the registration of said color magenta;

(f) overlaying using the yellow printer each of the black reference register marks corresponding to the color yellow with a corresponding yellow register mark, each of said yellow register marks being comprised of a yellow color area;

(g) measuring a single value of average reflectance for each overlay of said black reference and yellow register marks, said single value of average reflectance being measured at a single point in time over the entirety of a third region comprised of a plurality of subregions formed as the result of said overlaying of the black reference and yellow register marks, said subregions being comprised of a clear subregion having an area equal to the clear area of the black reference register mark corresponding to the yellow overlay to the extent said clear area is not overlayed by said yellow color area, a black subregion having an area equal to a portion of said black area within said third region to the extent said portion is not overlayed by said yellow color area, a yellow subregion having an area equal to said clear area to the extent said clear area is overlayed by said yellow color area, and an overlay subregion having an area equal to said portion of said black area within said third region to the extent said portion is overlayed by said yellow color area, said average reflectance being a monotonic function of the registration of the color yellow, each of said measured single values of average reflectance being an area-weighted sum of the reflectance of said subregions and representative of the registration of said color yellow;

(h) converting each of the measured single values of average reflectance representative of the registration of the cyan, magenta and yellow printers to a corresponding cyan, magenta and yellow registration error signal, respectively, using a predefined equation;

(i) inputting the cyan, magenta and yellow registration error signals into a closed-loop control system operatively connected to a printing press cylinder registration mechanism of each of the cyan, magenta and yellow printers to adjust each of said mechanisms and thereby automatically maintain the registration of the cyan, magenta and yellow printers;

(j) printing at predetermined locations in the nonimage areas of the sheet for each of the black, cyan, magenta and yellow colors;

(1) at least one first color bar pattern comprised of a plurality of linear bars parallel to the direction of motion of the paper, each of said bars having a width equal to the spacing between said bars, and (2) at least one second color bar pattern comprised of a plurality of linear bars perpendicular to the direction of motion of the paper, each of said bars having a width equal to the spacing between said bars, (k) measuring the reflectance of each of said first and second color bar patterns, said reflectance of said first color bar pattern being representative of fill-in, said reflectance of said second color bar pattern being representative of slur; and (l) compensating for said fill-in and slur in said black, cyan, magenta and yellow colors in converting said single values of average reflectance into said first, second and third registration error signals.

9. A method as recited in claim 8 wherein each of said black reference register marks consists of a closed clear area within a black surround, the closed clear area of each of said reference register marks having one border consisting of a substantially straight line, said border being oriented substantially parallel to the direction in which registration is to be sensed; each of said cyan register marks consists of a solid cyan rectangle, said rectangle being oriented such that one edge thereof is substantially perpendicular to the direction in which registration is to be sensed; each of said magenta register marks consists of a solid magenta rectangle, said rectangle being oriented such that one edge thereof is substantially perpendicular to the direction in which registration is to be sensed; each of said yellow register marks consists of a solid yellow rectangle, said rectangle being oriented such that one edge thereof is substantially perpendicular to the direction in which registration is to be sensed.

10. A method as recited in claim 9 wherein the closed clear area of each of said black reference register marks is rectangular in shape.

11. A method as recited in claim 8 further comprising the steps of:
(m) printing at predetermined locations in the non-image areas of the sheet at least one solid patch for each of the colors black, cyan, magenta and yellow,
(n) measuring the reflectance of each of said solid patches and thereby, of said black, cyan, magenta and yellow colors, and
(o) compensating for variations in said reflectance of said black, cyan, magenta and yellow colors in converting said single values of average reflectance into said cyan, magenta and yellow registration error signals.

12. Apparatus for automatically maintaining the color registration of a multi-color printing press having the capability of printing a reference color, a first process color, a second process color, and a third process color comprising:
(a) reference color printing means for printing at predetermined locations in the non-image areas of a sheet to be printed at least one reference register mark corresponding to each of the first, second and third process colors, each of said reference register marks being comprised of a reference color area and a clear area;
(b) first process color printing means, second process color printing means, and third process color printing means for overlaying each of the reference register marks corresponding to the first process color, the second process color, and the third process color, respectively, with a corresponding first process color, second process color and third process color register mark, each of said first, second and third process color register marks being comprised of a first, second and third process color area, respectively;
(c) reflectometer means for measuring a single value of average reflectance for each overlay of said reference and first process color register marks, each overlay of said reference and second process color register marks, and each overlay of said reference and third process color register marks, each of said single values of average reflectance being measured at a single point in time over the entirety of a region comprised of a plurality of subregions formed as the result of said overlaying of said reference and said process color register marks, said subregions being comprised of a clear subregion having an area equal to the clear area of the reference register mark of the overlay being measured to the extent said clear area is not overlayed by a corresponding one of said process color areas, a reference color subregion having an area equal to a portion of said reference color area within said region to the extent said portion is not overlayed by said corresponding one of said process color areas, a process color subregion having an area equal to said clear area to the extent said clear area is overlayed by said corresponding one of said process color areas, and an overlay subregion having an area equal to said portion of said reference color area within said region to the extent said portion is overlayed by said corresponding one of said process color areas, said average reflectances of said first process color, second process color and third process color overlay regions being a monotonic function of the registration of the first process color, second process color and third process color, respectively, each of said measured single values of average reflectance being an area-weighted sum of the reflectance of said subregions and representative of the registration one of said process colors;
(d) means for converting each of the measured single values of average reflectance representative of the registration of the first, second, and third process colors to a corresponding first, second and third registration error signal, respectively, using a predefined equation;
(e) control means operatively connected between said converting means and said multicolor printing press, and responsive to said first, second and third registration error signals, for adjusting printing mechanisms within said multicolor printing press corresponding to said first, second and third process colors, to thereby automatically maintain the color registration of said first, second and third process colors;
(f) means for printing at predetermined locations in the non-image areas of the sheet at least one solid patch for each of the reference, first, second and third process colors;
(g) means for measuring the reflectance of each of said solid patches;
(h) means for compensating for variations in the reflectance of said reference and said first, second and third process colors in converting said single values of average reflectance into said first, second and third registration error signals;
(i) means for printing at predetermined locations in the non-image areas of the sheet for each of the reference, first, second and third process colors;
(1) at least one first color bar pattern comprised of a plurality of linear bars parallel to the direction of motion of the paper, each of said bars having a width equal to the spacing between said bars, and
(2) at least one second color bar pattern comprised of a plurality of linear bars perpendicular to the direction of motion of the paper, each of said bars having a width equal to the spacing between said bars, (j) means for measuring the reflectance of each of said first and second color bar patterns, said reflectance of said first color bar pattern being representative of fill-in, said reflectance of said second color bar pattern being representative of slur; and (k) means for compensating for variations in the reflectance of said first and second color bar patterns, and thereby, said fill-in and slur in said reference and first, second and third process colors in converting said single values of average reflectance into said first, second and third registration error signals.

13. An apparatus as recited in claim 12 wherein each of said reference registrations marks consists of a clear area completely surrounded by the reference color.

14. An apparatus as recited in claim 12 wherein each said reference register mark consists of a clear rectangular area surrounded by the reference color, one border of said rectangular area being oriented substantially parallel to the direction in which registration is to be sensed; each of said reference register marks being configured in the shape of a rectangle, said rectangle being oriented such that one edge thereof is substantially perpendicular to the direction in which registration is to be sensed.

15. An apparatus as recited in claim 12 wherein said predefined equation is an algebraic expression for each of said registration error signals as a function of the corresponding measured single value of average reflectance, and the reflectance of said reference color, of one of said process colors, of the paper and of an overlay of said process color and said reference color.

16. An apparatus as recited in claim 12 wherein said predefined equation is an algebraic expression for each of said registration error signals as a function of the corresponding measured single value of average reflectance, and the reflectance of said reference color, of one of said process colors, of the paper, and of an overlay of said process color and said reference color, and the amount of slur and fill-in of said reference color and said process color.

* * * * *